United States Patent [19]

Mettersheimer, Jr.

[11] 4,335,319
[45] Jun. 15, 1982

[54] HYDRO-ELECTRIC POWER APPARATUS UTILIZING OCEAN CURRENTS

[75] Inventor: John H. Mettersheimer, Jr., Sanford, Fla.

[73] Assignee: Charles B. Cannon, Chicago, Ill.

[21] Appl. No.: 181,718

[22] Filed: Aug. 27, 1980

[51] Int. Cl.³ .............................................. F03B 13/10
[52] U.S. Cl. .......................................... 290/54; 415/7
[58] Field of Search ..................... 290/54; 415/2 R, 7, 415/2, 3, 4

[56] References Cited

U.S. PATENT DOCUMENTS

| | | | |
|---|---|---|---|
| 833,361 | 10/1906 | Wilmore | 290/43 |
| 1,123,491 | 1/1915 | Corbin | 290/54 |
| 2,501,696 | 3/1950 | Souczek | 290/43 |
| 3,426,540 | 2/1969 | Fixel | 61/20 |
| 3,912,937 | 10/1975 | Lesser | 290/43 |
| 3,928,771 | 12/1975 | Straumsnes | 290/43 |
| 3,986,787 | 10/1976 | Mouton et al. | 415/7 |
| 4,023,041 | 5/1976 | Chappell | 290/53 |
| 4,026,587 | 5/1977 | Hultman et al. | 290/53 |
| 4,163,904 | 8/1979 | Skendrovic | 290/54 |

Primary Examiner—J. D. Miller
Assistant Examiner—D. L. Rebsch
Attorney, Agent, or Firm—Charles B. Cannon

[57] ABSTRACT

A hydro-electric power apparatus including an electrical generator is mounted in a combination power house and crew housing disposed at or above the surface of a current of ocean or other water current and a hydraulic turbine for driving the electrical generator is suspended into the water from a supporting platform on which the power house and crew housing are mounted. The power house and crew housing and the supporting platform are anchored to the floor of the ocean or like body of water without the use of walls, ramps or the like. The supporting platform provides a helipad landing for a helicopter transporting food and supplies for the maintenance crew and repair and replacement parts for the electrical generator and other parts of the apparatus. A water inlet or intake nozzle is suspended from the supporting platform to direct a maximum hydraulic force of the ocean or other water current in the area into the hydraulic turbine. A fluid pressure responsive water direction and velocity control device is provided in association with the water inlet or intake nozzle for sensing the direction of flow of the water current in the area so as to direct the water current having the highest available fluid velocity into the water inlet or intake nozzle and then into the hydraulic turbine. Power transmission cable means are provided for transmitting the electrical energy developed by the turbine-driven electrical generator to on-shore positions of use. All of the components of the apparatus, other than the hydraulic turbine and the water inlet or intake nozzle, and parts of the water current direction flow and velocity sensing device are located in the power house and hence are not submerged in the salt or other water and hence are not subject to the corrosive and other adverse effects of submergence in salt or other water.

13 Claims, 27 Drawing Figures

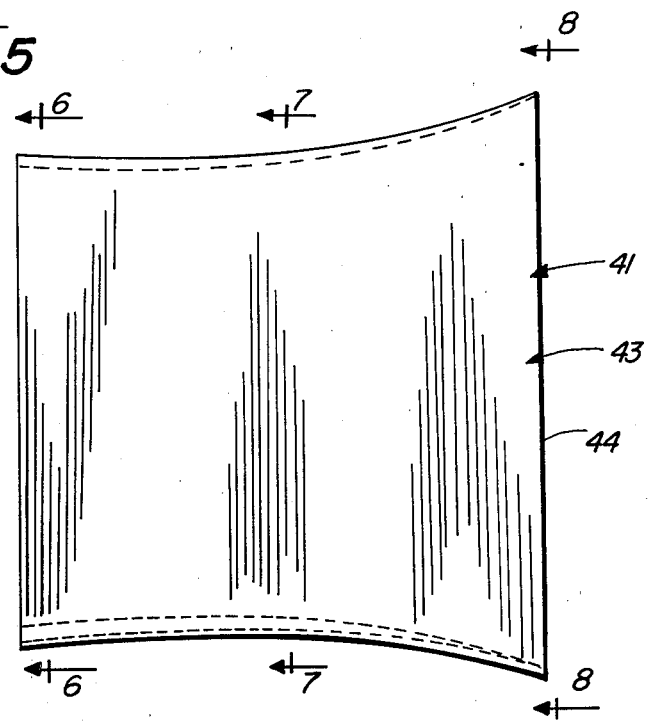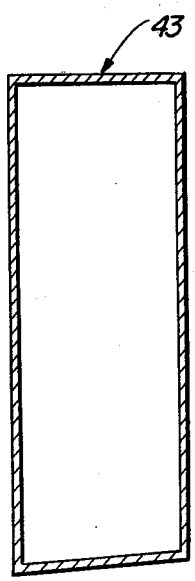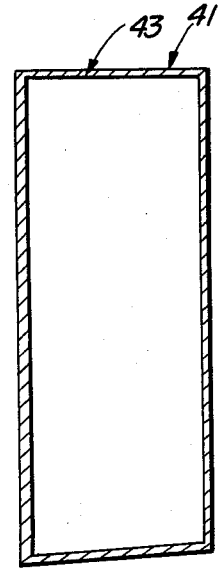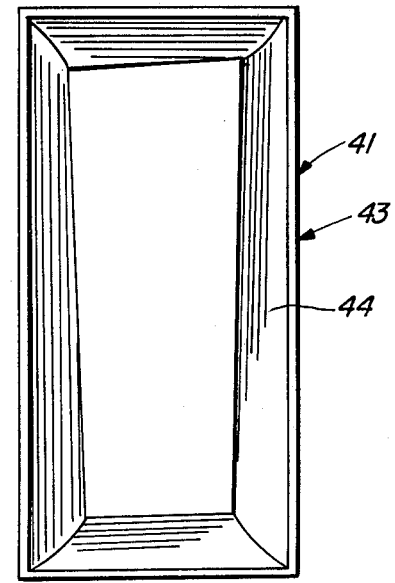

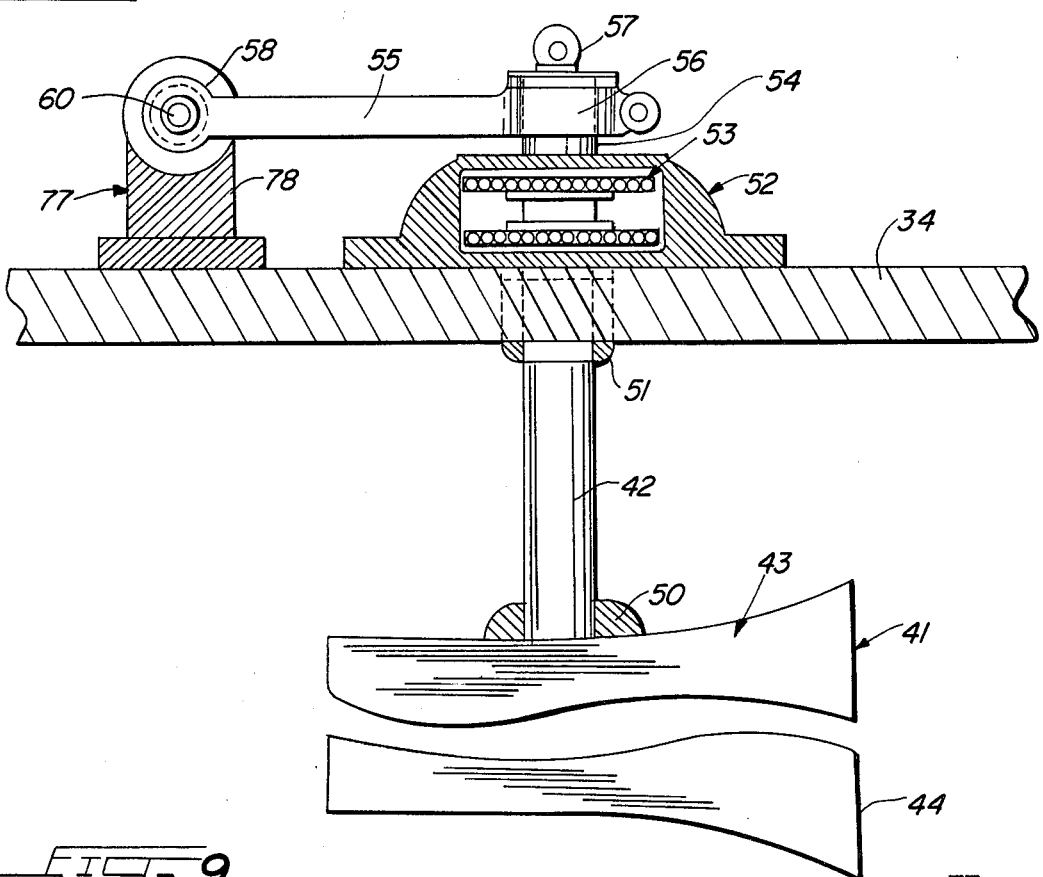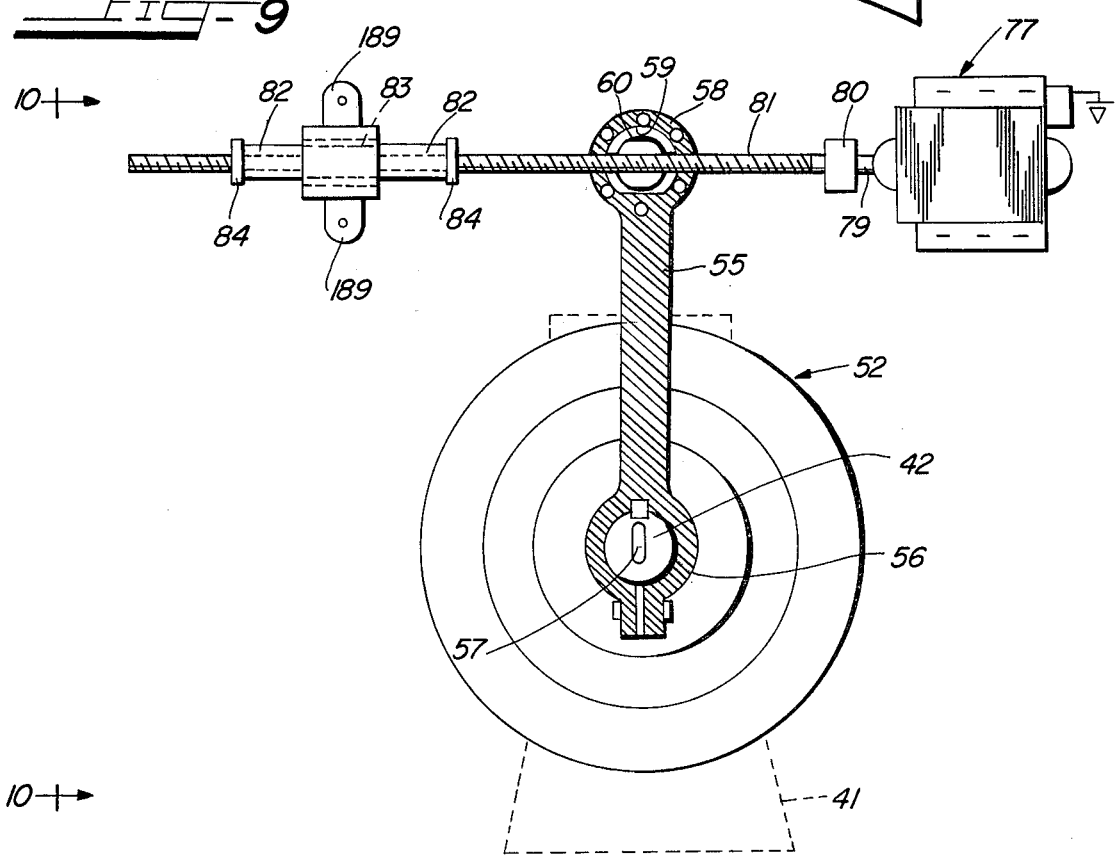

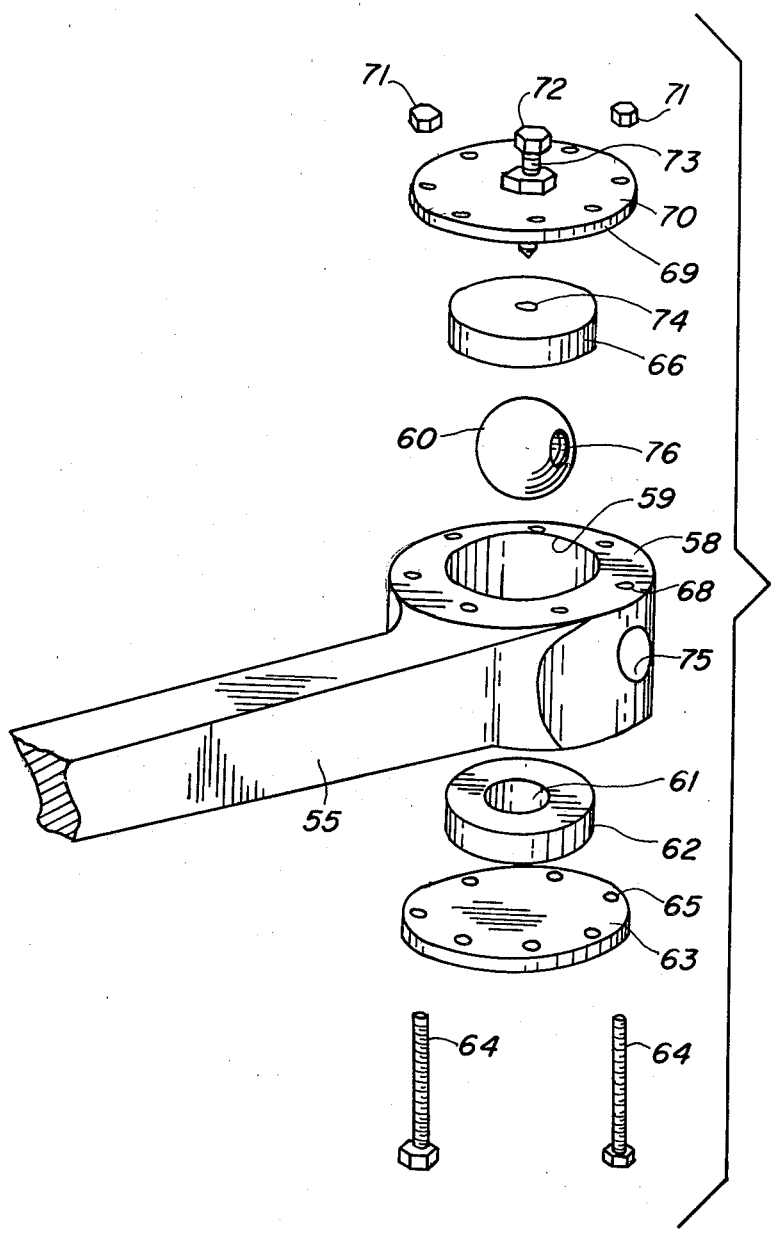

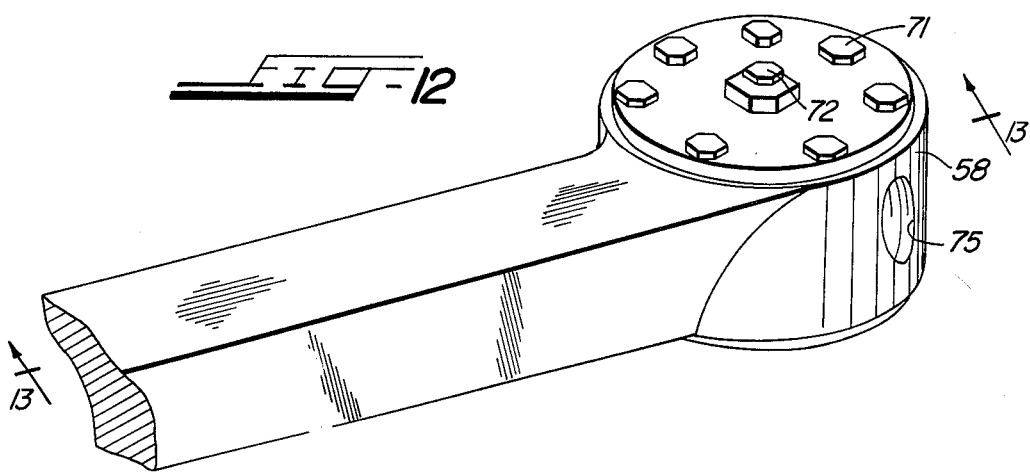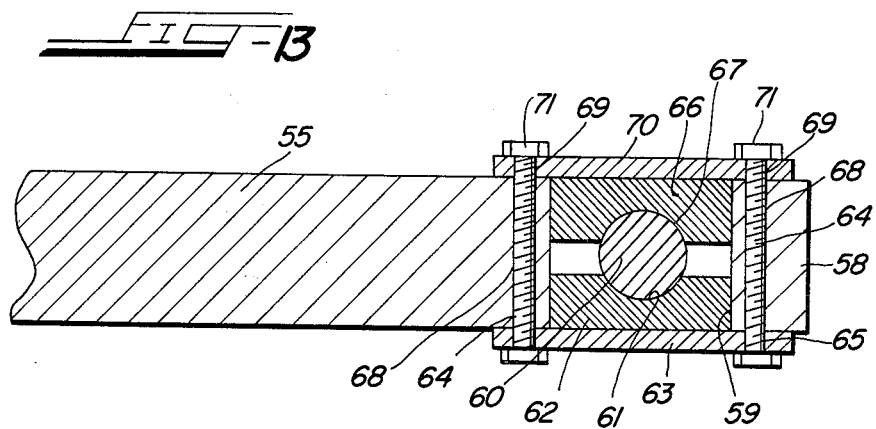

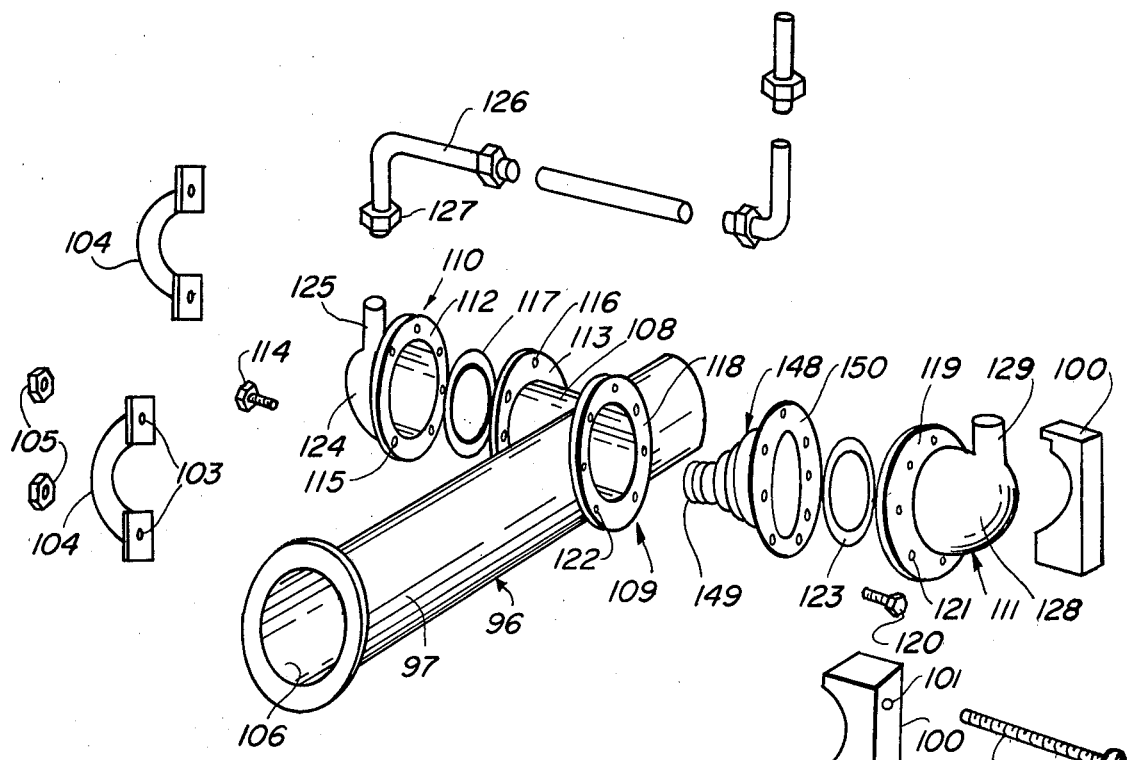
FIG-17
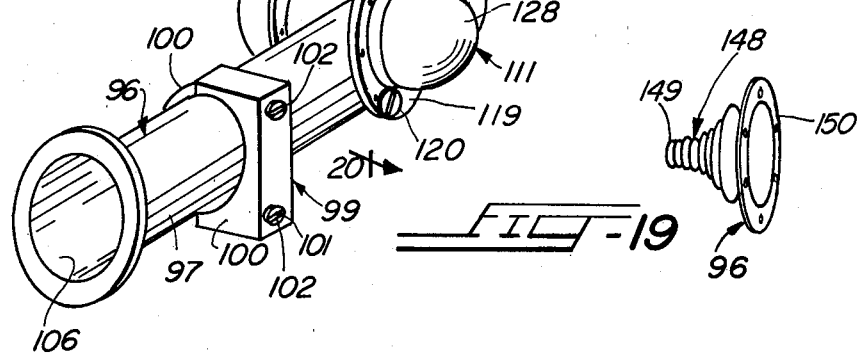
FIG-18
FIG-19

CURRENT FLOW

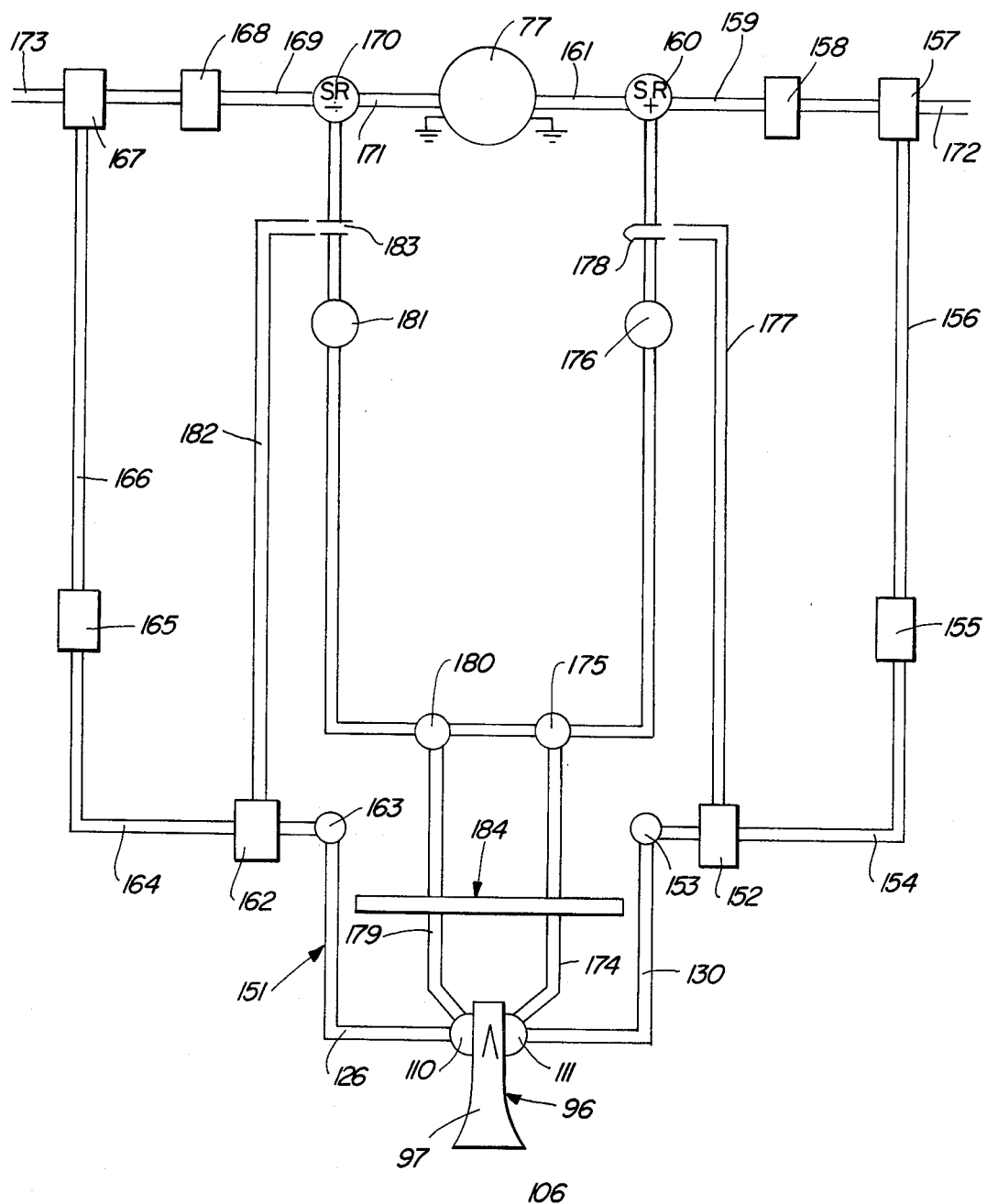

HYDRO-ELECTRIC POWER APPARATUS UTILIZING OCEAN CURRENTS

BACKGROUND OF THE INVENTION

Various forms of hydro-electric apparatus utilizing ocean tides, and other ocean currents, as a source of power for generating electrical energy have been known and used heretofore. However, such prior apparatus have not, in general, been satisfactory or efficient due to design, cost of installation, inefficiency in operation, immersion of the apparatus in salt water with resulting corrosion and deterioration, and for other reasons.

The prior art patents of which applicant is aware, as showing the state of the prior art, are the following U.S. Pat. Nos., namely, 833,361, dated Oct. 16, 1906 to J. T. Wilmore on "Wave and Current Electrical Generator"; 2,501,696 dated Mar. 28, 1950 to E. Souczek on "Stream Turbine"; 3,426,540 dated Feb. 11, 1969 to A. E. Fixel on "Tidewater Power Generation System"; 3,912,937 dated Oct. 14, 1975 to Jerome M. Lesser on "Submarine Electrical Energy Generating Apparatus"; 3,928,771 dated Dec. 23, 1975 to O. Robert Straumnes on "Water Current Power Generator System"; 3,986,787 dated Oct. 19, 1976 to William J. Mouton, Jr., et al on "River Turbine"; 4,023,041 dated May 10, 1977 to Walter L. Chappell on "Apparatus for Generating Electricity and Power from Natural Flow"; 4,026,587 dated May 31, 1977 to Robert H. Hultman, et al on "Underwater Turbine Operated by Ocean Currents"; and 4,163,904 dated Aug. 7, 1979 to Lawrence Skendrovic on "Understream Turbine Plant".

One of the major objections to the prior art apparatus, as disclosed in certain of the aforesaid prior art patents, is the fact that they rely upon apparatus which is totally immersed or submerged in ocean or other salt waters which results in damage to such apparatus in the form of corrosion and otherwise, particularly if such apparatus is totally immersed or submerged in salt water for a prolonged period of time.

OBJECTS OF THE INVENTION

An object of the invention is to provide an apparatus which utilizes ocean or other water currents efficiently for generating electrical power.

Another object of the invention is to provide a novel and efficient hydro-electric generator apparatus in which the major components of the apparatus, other than the water intake or inlet nozzle and the hydraulic turbine, and parts of the sensor control means for the water inlet or intake nozzle, are mounted above the surface of water, as a fixed and permanently anchored structure, and are not submerged or immersed in the water, and hence are not free-floating or subject to the variations of waves, winds, etc., and thus avoid the corrosive effects of salt water while, at the same time, the apparatus is readily available for maintenance, repair and replacement of parts.

A further object of the invention is to provide a new and improved hydro-electric generator apparatus which utilizes ocean or other water currents as a source of hydraulic power and which directs hydraulic force against a hydraulic turbine for operation of an alternator, or other electrical generator, and which does not require the use or need for expensive and massive ocean floor construction of ramps, walls, dams, or the like.

An additional object of the invention is to provide a hydraulic turbine which utilizes a novel movably mounted and sensor-controlled water intake or inlet nozzle which is automatically directed most advantageously toward the direction of the inflowing ocean or like water current in the area in which the new hydro-electric power plant is located so as to utilize to the greatest advantage the maximum hydraulic force of the ocean or like water current for the operation of the hydraulic turbine and the alternator, or other electrical generator, operated thereby, and the resulting efficient generation of electricity from the use of the ocean or like water current as a source of free energy.

Another object of the invention is to provide a novel sensor control means and circuit for positioning the movably mounted water intake or inlet nozzle so that it automatically senses the force and direction of the ocean or like water current and positions the water intake or inlet nozzle in a position to utilize to the greatest advantage the greatest available hydraulic force of the ocean or like water current for operation of an alternator or other electrical generator.

A further object of the invention is to provide a new and improved hydraulically driven alternator, or other electrical generator, for the generation of electric power from ocean currents in which none of the electrical power producing members embodied in the invention, other than the driven turbine water inlet or intake nozzle and parts of the sensor control means therefor, are submerged or immersed in the salt ocean water, or other water, and hence may be readily sealed and are free from the highly corrosive effect of the heat which results from such immersion and the dehumidifying action of such immersion in a closed system, thereby prolonging the longevity of the new electrical power generator apparatus.

Other objects will appear hereinafter.

DESCRIPTION OF FIGURES IN THE DRAWINGS

FIG. 5 is an enlarged side elevational view of the water inlet or intake nozzle;

FIG. 6 is a transverse vertical sectional view of the water inlet or intake nozzle, on line 6—6 in FIG. 5, and as seen adjacent the outlet side or end thereof;

FIG. 7 is a transverse vertical sectional view of the water inlet or intake nozzle, on line 7—7 in FIG. 5, and taken centrally between the water inlet or intake end and the water outlet end thereof;

FIG. 8 is a front elevational view of the water inlet or intake nozzle, on line 8—8 in FIG. 5, as seen from the water inlet side thereof;

FIG. 9 is a view, partly in section and partly in elevation, of the sensor-controlled operating means, including the stepping motor, for the water inlet or intake nozzle and its radius arm operating shaft and its supporting shaft;

FIG. 10 is an enlarged side elevational view, on line 10—10 in FIG. 9, partly in section, of the water inlet or intake nozzle and its mounting, and illustrating parts of the sensor-controlled operating means for the water inlet or intake nozzle, as shown in FIG. 9;

FIG. 11 is an exploded perspective view of the radius arm and related parts associated therewith for positioning the water inlet or intake nozzle, and its supporting shaft, under control of the water intake nozzle sensor control means;

FIG. 12 is an assembled perspective view of the parts of the radius arm shown in FIG. 11;

FIG. 13 is a longitudinal sectional view of the radius arm on line 13—13 in FIG. 12;

FIG. 17 is an exploded perspective view of the water-conducting sensor tube and related parts which are embodied in the sensor control means for the water inlet or intake nozzle which is embodied in the invention;

FIG. 18 is an assembled perspective view of the sensor control device shown in FIG. 17;

FIG. 19 is a perspective view of a part of the sensor control switch device for the water inlet or intake nozzle shown in FIGS. 17 and 18;

FIG. 27 is a schematic circuit diagram of the control and operating circuit for the nozzle sensor control device and associated parts embodied in the invention.

GENERAL DESCRIPTION OF THE INVENTION AS SHOWN IN THE DRAWINGS

Figure 1:
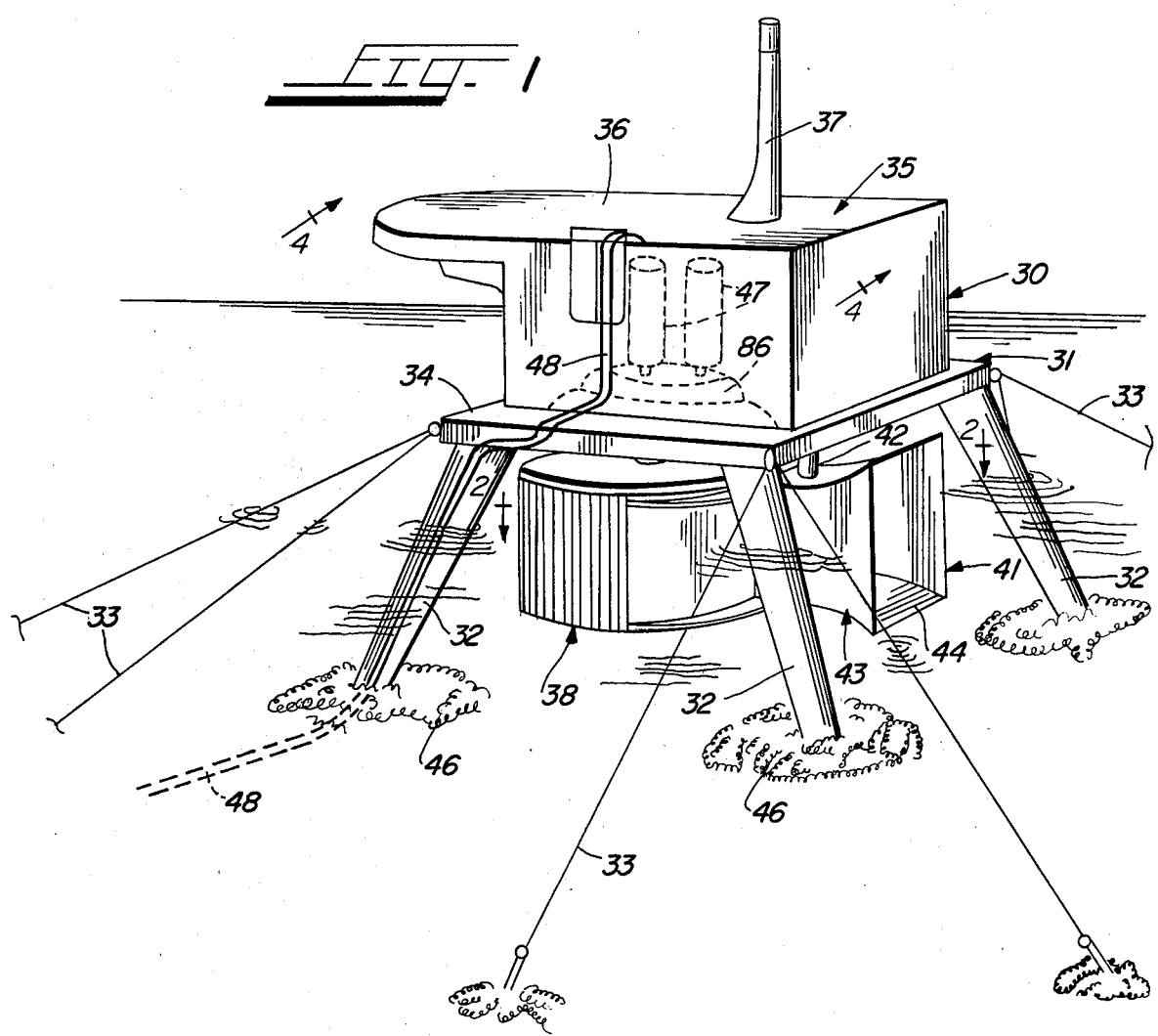
FIG. 1 is a perspective schematic view illustrating a typical and preferred embodiment of the invention.

A typical and preferred embodiment of the invention is illustrated in the drawings, wherein it is generally indicated at 30, and comprises a supporting structure, generally indicated at 31, which is mounted and permanently anchored above the surface of an ocean or other body of water, and is supported by a plurality of suitably spaced and angularly extending supporting leg members 32 which may be permanently anchored, as at 46, in the floor of an ocean or like body of water. In addition, the supporting structure 30 may be further secured in position of use by means of anchor members 33 which are permanently anchored in the ocean floor or like body of water.

The supporting structure 30 includes a generally flat and geometrically shaped horizontally extending supporting platform 34, shown as being generally rectangular in form, but which may have any desired shape, and on which a combination power house and crew housing, generally indicated at 35, is mounted above the surface of the water. The combination power house and crew housing 35 includes an upper and horizontally extending surface 35 which provides a helipad for the landing and take-off of helicopters which may service the new hydro-electric power plant as to materials and supplies, food, etc., required by the crew stationed in the combination power house and crew housing 35, and for inspection, maintenance, repair and replacement of the parts, of the apparatus, or for other purposes. A warning signal, such as a quick flashing blue light signal 37, or the like, may be mounted on the upper surface 36 of the combination power house and crew housing 35.

Figure 2:
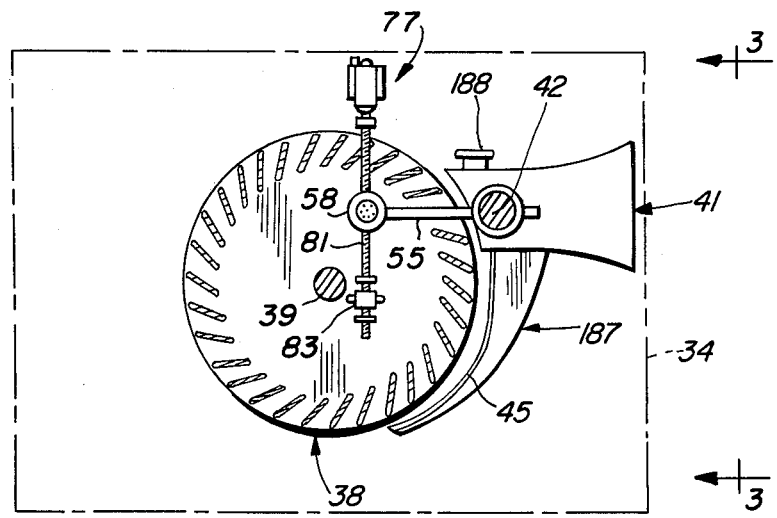
FIG. 2 is a plan view, partly in section, on line 2—2 in FIG. 1, illustrating the water inlet or intake nozzle and the hydraulic turbine driven by the force of the ocean water, or like water current, flowing into and through the inlet or intake nozzle.
Figure 3:
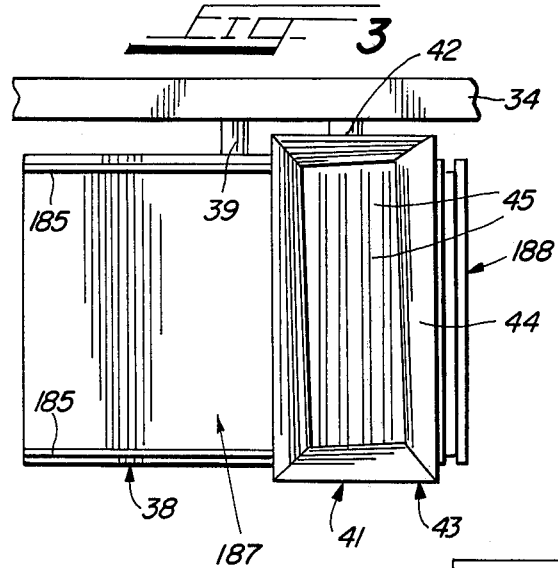
FIG. 3 is a front elevational view of the water inlet or intake nozzle, on line 3—3 in FIG. 2.

The present invention includes a hydraulic turbine unit, generally indicated at 38, and which may be of any suitable design, and which is mounted on and is rotatably suspended, on a vertically extending shaft unit 39, from and below the supporting platform 34, the hydraulic turbine 38 being provided with a curvilinear shield 187 (FIGS. 2 and 3), which affords an aerodynamic principled fluidic vacuum point to the hydraulic turbine 38.

The new hydraulic turbine unit 38 has a water inlet or intake nozzle, which is generally indicated at 41, and is generally in the shape of a funnel, and is swivelly mounted, by means of a vertically extending supporting shaft 42, and may be submerged in a selected ocean area, or other body of water, below the supporting platform 34. The water intake or inlet nozzle 41 includes a generally funnel-shaped body 43 having an outwardly flared water intake or inlet mouth 44 which embodies parallel spaced guard members 45 (FIG. 3) which prevent the intake of fish or other marine creatures, or foreign bodies, into the nozzle 41 and into the body of the hydraulic turbine 38.

A pair of parallel fins 185 are mounted on the inboard side of the nozzle 41 and redirect the turbulence of the water current so that the water which passes the nozzle 41 produces a vacuum point.

The new hydro-electric apparatus 30 includes a pair of alternators, or other electrical generator unit, generally indicated at 47, (FIGS. 1 and 4), which may be of any suitable design and construction, and underwater power transmission cable means 48 are provided (FIG. 1) for conducting the electric power from the alternator, or other electrical generator 47, to on-shore points where the electrical power thus generated may be used.

The present invention includes a novel water pressure responsive direction and water current velocity nozzle sensor control means, generally indicated at 96, (FIGS. 15, 16, 17, 18, 19, 20, 21, 22, 23, 24, 25 and 26) for sensing the direction and velocity of the sea water or like water current at the mouth or water inlet side 44 of the water inlet or intake nozzle 41 and which automatically positions the water inlet or intake nozzle 41 in a position to utilize most advantageously the maximum available hydraulic force of the ocean or other water current into the mouth 44 of the water inlet or intake nozzle 41, and thence into the hydraulic turbine 38 so as to drive the alternator, or other electrical generator 47, and thus utilize the maximum available hydraulic force of the ocean or other water current in the area for the generation and electrical power.

THE MOUNTING AND OPERATING MEANS FOR MOUNTING AND OPERATING THE WATER INLET OR INTAKE NOZZLE 41 (FIGS. 1, 2, 3, 4, 9, 10, 11, 12 AND 13)

As shown in FIGS. 1, 2, 3, 4, 9, 10, 11, 12 and 13, the water inlet or intake nozzle 41 is mounted on and supported vertically by the supporting shaft 42, to which it is attached by means of a suitable collar 50, and is swivelly mounted and suspended from the supporting platform 34 for immersion in the ocean, or like body of water, by means of a shaft-supporting bearing structure 51 (FIG. 10); the supporting shaft 42 being preferably formed of ceramic-cased tubular steel which is highly resistant to the action of salt water. The upper end portion of the nozzle-supporting shaft 42 projects above the upper surface of the supporting platform 34 and into a supporting bearing housing 52 which is mounted on the upper surface of the supporting platform 34 and which houses an anti-friction radial thrust roller bearing unit 53 (FIG. 10).

THE CONSTRUCTION OF THE NOZZLE OPERATING RADIUS ARM AND THE ELECTRICAL STEPPING MOTOR MEANS FOR MOVING THE NOZZLE OPERATING RADIUS ARM AND THE NOZZLE SUPPORTING SHAFT 42 FOR POSITIONING THE NOZZLE 41 (FIGS. 9, 10, 11, 12 AND 13)

The nozzle-supporting shaft 42 has an upper end portion 54 which projects above the bearing housing 52 and one end portion of a nozzle-operating radius arm 55 is attached thereto by means of a pair of clamping arms 56 which are formed as an integral part of the radius arm 55 (FIGS. 9 and 10); a lifting eye 57 being provided on the upper end portion of the nozzle-supporting shaft 42 for lifting the nozzle-supporting shaft 42 and associated parts for the purpose of maintenance and repair, etc. The other end portion 58 of the nozzle control radius arm 55 is generally circular in form and has a bore or cavity 59 formed therein in which a ball-shaped internally threaded all-angle nut 60 is enclosed and is movably mounted, as will be described more fully hereinafter.

As shown in FIG. 11, the ball-shaped internally threaded all-angle nut 60 is mounted within the bore or cavity 59 in the generally circular-shaped end portion 58 of the radius arm 55 wherein it is movably mounted in a bearing recess or cavity 61 which is formed in an annular lower bearing pad member 62. The bearing pad member 62 is retained in position of use in the bore or cavity 59 of the generally annular-shaped end portion 58 of the radius arm 55 by a generally annular closure plate 63 and threaded fastening screws 64 which are extended through openings 65 in the closure plate 63 and through openings 68 in the annular end portion 58 of the radius arm 55 and through openings 69 in an upper closure plate 70 and into threaded nuts 71 which are arranged above the upper closure plate 70 (FIGS. 11, 12 and 13).

An annular bearing and tension adjusting member 66 is arranged within the bore or cavity 59 in the annular end portion 58 of the radius arm 55 and has a bearing recess 67 formed in the lower surface thereof (FIG. 13) for the reception of the upper portion of the ball-shaped all angle internally threaded nut 60 (FIGS. 11 and 13). A threaded tension-adjusting screw 72 is threaded through a centrally arranged tapped or threaded opening 73 in the upper closure plate 70 and into a centrally arranged oval opening 74 in the combination bearing pad and tension-adjusting member 66 (FIG. 11).

As shown in FIGS. 11 and 13, the tension of the combination bearing pad and tension-adjusting member 66 on the upper surface of the ball-shaped internally threaded all-angle nut member 60 may be varied by adjusting the tension-adjusting screw member 72 on and relative to the combination bearing pad and tension-adjusting member 66.

As shown in FIGS. 11 and 12, the annular end wall 58 of the radius arm 55 has a pair of diametrically extending and aligned openings 75 formed therein and in the assembled position of the parts, as shown in FIGS. 12 and 13, the openings 75 are coaxially aligned with a diametrically extending threaded opening or bore 76 in the ball-shaped internally threaded all-angle nut 60, for a purpose which will be described hereinafter.

Figure 26:
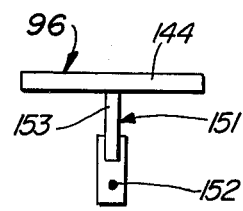
FIG. 26 is a detail view of a pressure adjusting device for the water-activated blade member embodied in each of the fluid pressure responsive sensor devices.

THE OPERATING MEANS FOR THE NOZZLE CONTROL RADIUS ARM 55 AND THE WATER INTAKE OR INLET NOZZLE 41 (FIGS. 9, 10 AND 26)

As shown in FIGS. 9, 10 and 27, the operating means for the nozzle control radius arm 55 and the water intake or inlet nozzle 41 includes an electrical stepping motor 77, which includes a housing 78 which is mounted on the upper surface of the supporting platform 34 and has a motor shaft 79, one end portion of which is releasably attached, by a clutch coupling 80, to an externally threaded drive shaft which is shown as having the form of a worm drive screw drive shaft 81 which extends through the pair of diametrically aligned openings 75 in the generally annular shaped end wall portion 58 of the radius arm 55 and through the diametrically extending internally screw threaded opening 76 in the movably mounted ball-shaped all angle nut member 60 (FIGS. 9, 11, 12 and 13).

The other end portion of the worm screw drive screw 81 is mounted in a pair of adjustable bearing members 82 which are mounted in a supporting member 83 which is mounted on the upper surface of the supporting platform 34 by means of attaching arms 189, the bearings 82 being adjustable in and relative to the supporting member 83 by means of clamping ring members 84 so that the bearings 82 may be adjusted as they become worn in use.

It will thus be seen, and as will be described more fully hereinafter, as the electrical stepping motor 77 is actuated it acts, through its motor shaft 79 and the worm drive screw shaft 81, to rotate the worm screw drive shaft 81 in the internally threaded movable mounted ball-shaped all angle nut member 60, and the generally annular end portion 58 of the radius arm 55, which cooperate to provide a ball and socket means, to impart a pivotal movement to the radius arm 55 and the nozzle-supporting shaft 42 attached thereto, and the water intake or inlet nozzle 41, relative to the hydraulic turbine 38, and thus position the water intake or inlet nozzle 41 in a position to take the greatest advantage of the ocean water current of the highest available velocity in the area flowing into the mouth 44 or water inlet of the nozzle 41.

The stepping motor 77 and the worm drive screw shaft 81 are under the control of a water current direction and velocity sensor device 96, which will be described hereinafter.

Figure 14:
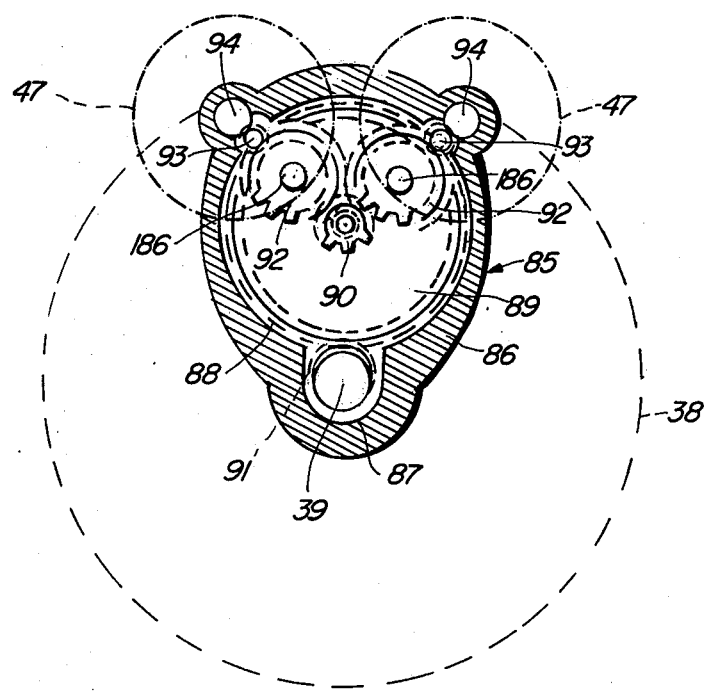
FIG. 14 is a sectional view, partly schematic, of the driving gear mechanism for operating the hydraulic turbine which operates the alternator or other electrical power generator driven thereby.

THE DRIVING MEANS FOR ROTATING THE HYDRAULIC TURBINE 38 AND THE ELECTRICAL GENERATOR OR ALTERNATOR 47 (FIG. 14)

The means for operating the hydraulic turbine 38 and the electrical generator or alternator 47 is shown as having the form of a driving gear mechanism which is illustrated in FIG. 14 of the drawings, wherein it is generally indicated at 85, and includes a gear housing 86 which is mounted in the housing 35 on or above the supporting platform 34, and has a vertically extending opening 87 formed therein through which the drive shaft 39 for the hydraulic turbine 38 extends.

The gear housing 86 has a central cavity 88 formed therein in which the main driving gear 89 for the hydraulic turbine 38 is rotatably mounted and a sun gear 90 is mounted on and is integrally attached to one face of the main driving gear 89, as shown in FIG. 14. A turbine input gear 91 is mounted on the hydraulic turbine shaft 39 within the opening 87 in the gear housing 86 (FIG. 14).

A pair of planetary idler gears 92 are mounted in the gear housing 86 and mesh with the sun gear 90 and with a pair of speed-increasing gears 93 which, in turn, mesh with pick-up driving gears 94 for driving the electrical generator or alternator 47.

In the use of the present invention, as will be described more fully hereinafter, as the ocean or other water current flows into the mouth 44 and through the nozzle 41 it rotates the hydraulic turbine 38 which acts, through its supporting shaft 39 and the gear 91 thereon, and the gear train 89-90-92-93 and 94 to rotate the electrical generators or alternators 47 and thus generate electric power which may be conducted, by the electric power transmission cables 48, to an on-shore position of use.

THE WATER CURRENT FLOW DIRECTION AND VELOCITY SENSOR CONTROL DEVICE (FIGS. 15,16,17,18,19,20,21,22,23,24,25 AND 26)

Figure 15:
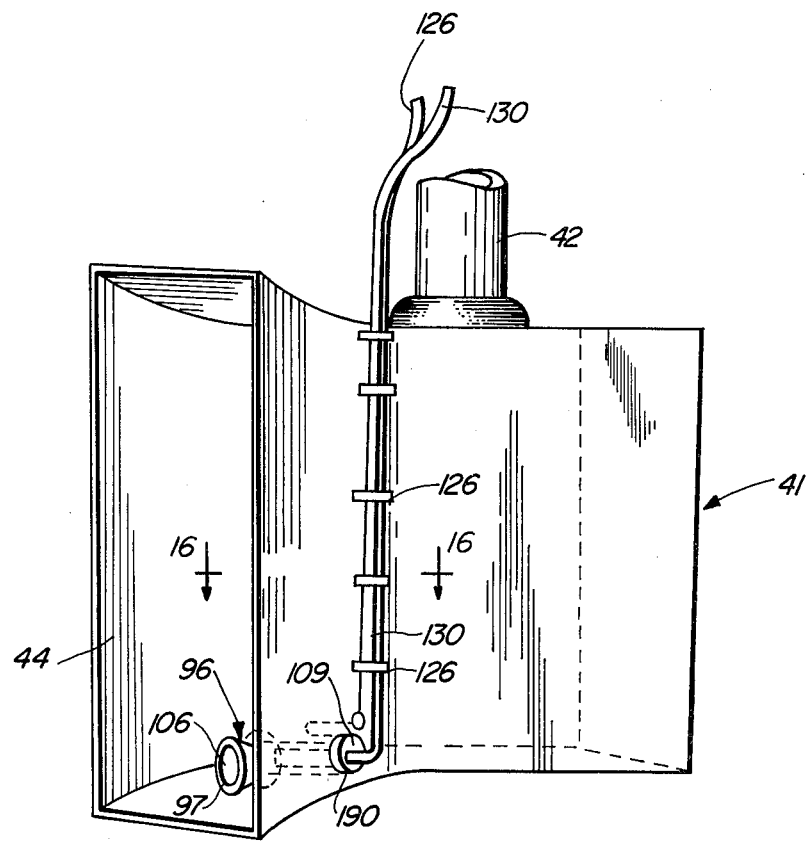
FIG. 15 is a perspective view of the water inlet or intake nozzle and illustrating parts of the nozzle control sensor means embodied in the invention.
Figure 16:
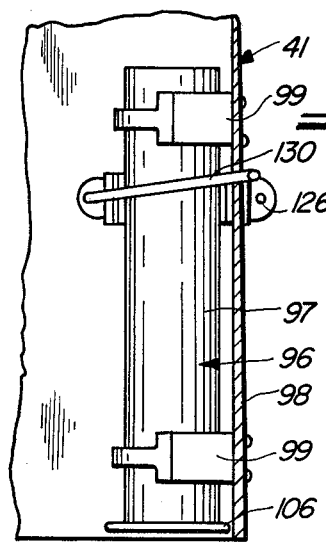
FIG. 16 is a sectional plan view, on line 16—16 in FIG. 15, illustrating parts of the water inlet or intake nozzle and the water-conducting sensor tube embodied in the sensor control means.
Figure 20:
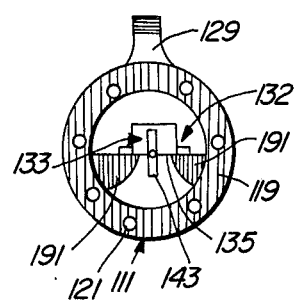
FIG. 20 is a sectional view, on line 20—20 in FIG. 18, illustrating one of the cable cap units embodied in the invention and the sensor switch housed therein and which form a part of the sensor control device for the water inlet or intake nozzle illustrated in FIGS. 17, 18, 19, 20, 21 and 22.

As pointed out hereinbefore, the present invention embodies a water current flow direction and velocity sensor control device, which is generally indicated at 96, and is illustrated in FIGS. 15, 16, 17, 18, 19, 20, 21, 22, 23, 24, 25 and 26 of the drawings, and includes a water-conducting generally cylindrical sensor tube 97 which is mounted within the nozzle 41, on a wall 98 thereof, by means of clamping supports 99 (FIG. 16).

As shown in FIG. 17, each of the clamping supports 99 includes a clamping member 100 having a pair of spaced openings 101 formed therein through which headed screws 102 are extended into corresponding threaded openings 103 in a complementary clamping member 104 and into threaded nuts 105, with the pairs of complementary clamping members 100 and 104 embracing the generally cylindrical sensor tube 97 so as to hold the water-conducting sensor tube 97 in position of use on the wall 98 of the nozzle 41 and with the inlet end or mouth 106 of the water-conducting sensor tube 97 being disposed at or adjacent to the inlet or mouth 44 of the nozzle 41 as shown in FIGS. 15 and 16.

Figure 21:
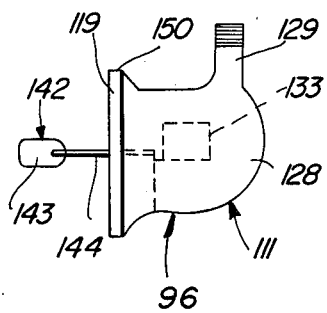
FIG. 21 is an elevational view of the parts shown in FIG. 20 and showing the sensor blade projecting from one of the cable cap housings into the path of water flowing through the water-conducting sensor tube for controlling the action of the sensor switch in the cable cap housing.
Figure 22:
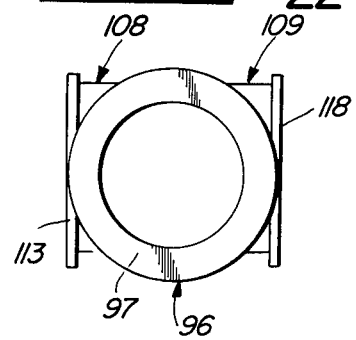
FIG. 22 is an end elevational view of the water-conducting sensor tube embodied in the sensor control device, as seen from the mouth or water inlet end of the sensor tube.

As shown in FIGS. 17, 18 and 22, the water-conducting sensor tube 97 has a pair of laterally extending tubular arms or branches 108 and 109 which project laterally therefrom at opposite sides of the sensor tube 97 and these tubular arms or branches 108 and 109 provide inlets into cable cap units 110 and 111, respectively, in each of which a sensor blade and switch unit controlled thereby are mounted, as shown in FIGS. 20, 21, 24 and 25, and which will be described hereinafter.

One of the arms or branches 109 of the water-conducting sensor tube 97 extends through an opening 190 in the wall 98 of the water intake or inlet nozzle 41 (FIG. 15).

Thus, the cable cap unit 110 is attached by an annular flange 112 thereon to an annular flange 113 of the tubular arm or branch 108 by means of screws 114 which pass through openings 115 into the flange 113 with a sealing ring 117 being disposed between the annular flanges 112 and 113. Similarly, the cable cap unit 111 is attached to an annular flange 118 of the tubular arm or branch 109 by means of an annular flange 119, which is formed on the body of the cable cap unit 111, with the annular flange 119 being attached to the annular flange 118 on the tubular arm or branch 109 by means of headed screws 120 which pass through openings 121 in the annular flange 119 and into corresponding openings 122 in the annular flange 118 with a sealing ring 123, and certain other parts which will be described hereinafter, being disposed between the annular flanges 119 and 118, as shown in FIGS. 17 and 18.

The body 124 of the cable cap unit 110 has a tubular extension 125 to which a cable 126 is attached by fastening means, such as 127, as shown in FIGS. 17 and 18.

Similarly, the body 128 of the cable cap unit 111 has a tubular extension 129 to which a cable 130 is attached by fastening means 131 (FIG. 18).

As shown in FIG. 15, the cables 126 and 130 extend upwardly outside of the wall 98 of the water intake or inlet nozzle 41 to which they are attached by the clamping members 126, and the cables 126 and 130 extend upwardly through openings (not shown) in the supporting platform 34 into the housing 35 for a reason which will be described hereinafter.

Figure 23:
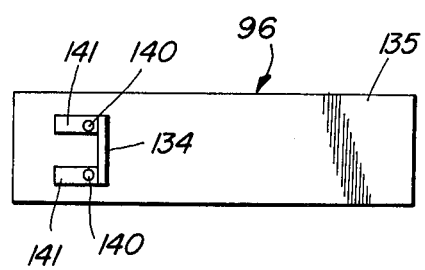
FIG. 23 is a detail view of the parts of the sensor control switch means which is illustrated in FIGS. 20, 21, and 24.
Figure 24:
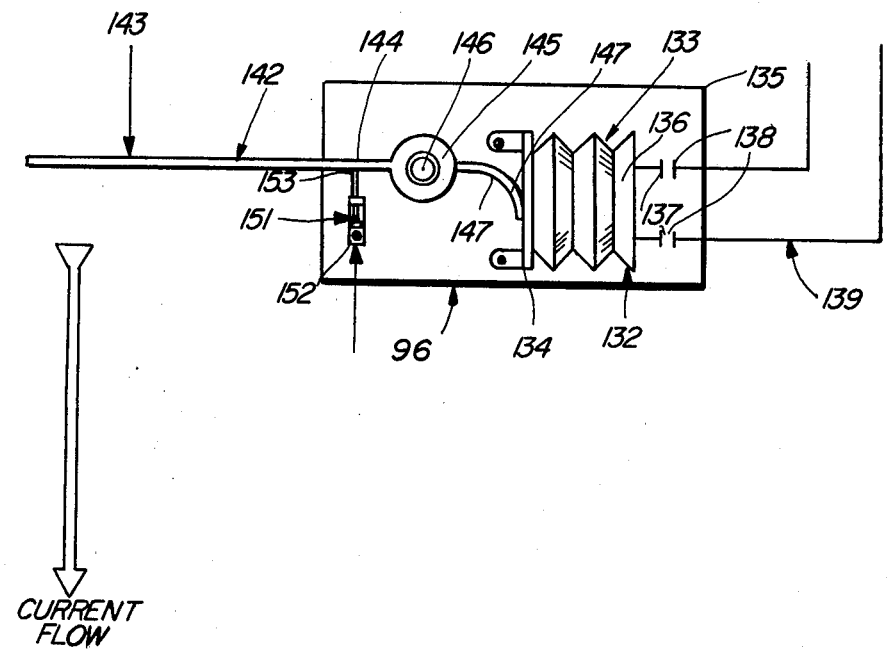
FIG. 24 is an elevational view, partly schematic, illustrating parts of the nozzle sensor control switch means illustrated in FIGS. 20, 21, 23, 25 and 26, as mounted in the cable cap units.

As shown in FIGS. 15, 16, 17, 18, 20, 21, 22, 23, 24, 25, 26 and 27, the present invention embodies a pair of water current direction and velocity sensor devices, generally indicated at 132, which are identical in construction so that only one of them will be described, namely, the water current direction and velocity sensor device 132 which is mounted on and partially within the cable cap 111. The sensor device 132 includes a sensor switch 133 which includes a berylium coil mounting bracket 134 which is slidably mounted on a supporting bracket 135 which is attached to the inner surface of a wall of the body 128 of the cable cap unit 111 to which is attached by screws 140 which project through slots 141 in the wall of the cable cap 111 (FIGS. 23 and 24). The sensor switch 133 includes a berylium accordion-shaped coil operating member 136 which is attached to the movable mounting bracket 134 (FIG. 24). The sensor switch 132 also includes a pair of movable switch contacts 137 which are attached to the accordion-shaped coil 133 and which are engageable with a pair of stationary switch contacts 138 which are mounted on the supporting bracket 135 of the cable cap 111 and are connected to an incoming 120 volt electric power line 139 (FIG. 24).

Figure 25:
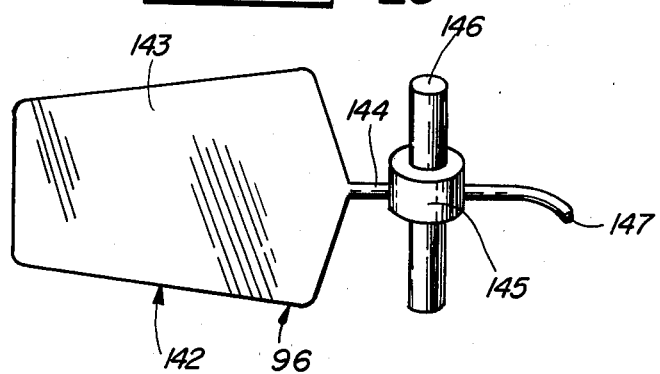
FIG. 25 is an elevational view of the water pressure responsive blade member and its pivotal mounting which forms part of the sensor control device illustrated in FIGS. 20, 21, 23, 24 and 26.

The water current direction and velocity sensor device 132 includes fluid pressure responsive means for operating the sensor switch 132. This fluid pressure responsive means is illustrated in FIGS. 24 and 25 of the drawings, and includes a fluid pressure responsive paddle-shaped blade member 143 having an arm 144 with which is integrally formed an annular collar 145 which is pivotally mounted on a pivot shaft 146 which is located within the cable cap 111. As shown in FIGS. 14 and 25, the annular collar 145 has a curved cam arm 147 formed integrally therewith and projecting laterally therefrom for camming engagement with the slidable bracket 134.

As shown in FIG. 21, the fluid pressure responsive paddle-shaped blade member 143 projects outwardly of the body 128 of the cable cap 111 and, in use, projects into the body of the sensor tube 97 and into the path of water flowing therethrough.

Each of the cable cap units 111 and 112 is sealed against water intrusion, with the paddle-shaped blade members 143 sealed throughout by means of a polyacrylic flexible water-resistant fabric boot or diaphragm which is generally indicated at 148 (FIGS. 17 and 19) and each of which has attached to one end portion thereof a clamping ring 149, and has its other end portion bonded to a brass retainer plate 150 which is of a size and dimension which enables it to be clamped into sealing engagement with one of the annular flanges 118 or 113 on the tubular arms or branches 109 and 108, respectively, of the sensor tube 97 and attached thereto by fastening elements 120 or 114 (FIG. 17).

As shown in FIG. 26, each of the sensor devices 132 includes a pressure adjusting device 151 for adjusting the water pressure to which the water-actuated blade members 143 are responsive. Each of these pressure adjusting devices 151 includes a supporting bracket 152 which is mounted on the supporting bracket 135 in the body 128 of the cable cap, as 111, and has a pressure-adjusting screw 153 adjustably mounted thereon.

It will thus be seen, and as will be described more fully hereinafter in connection with the description of the nozzle sensor control and operating circuit, shown in FIG. 27, that as the water flowing into the water direction and velocity sensor tube 97 engages the flexible water resistant boot or covering 148 for the paddle-shaped blade member 143 it causes the blade member 143 to pivot on the pivotal mounting shaft 146, thereby causing the curved cam arm 147 of the blade member 143 to engage and cam against the supporting bracket 134 and thus move the accordion-shaped switch operating member 133, and the movable switch contact members 137 attached thereto into contact or engagement with the stationary contact members 138 and thus close circuit to the 120 volt cable 130, for a purpose which will be described more fully hereinafter in connection with the description of the operating and control circuit 151 for the water current direction and velocity sensor device 96, as illustrated in FIG. 27.

The present invention includes a novel operating and control circuit for the water current flow direction and velocity sensor device and switch unit 132. This circuit is illustrated in FIG. 27, as a schematic diagram, wherein it is generally indicated at 151 and includes the sensor unit 96 and its sensor tube 97; the cable cap unit 111 and the 120 V. cable line 130 attached thereto; a 120 V. control transformer 152 which is located at a collector plate 184; a capacitor 153 which serves to maintain a constant control voltage of 120 V. therein to the velocity sensor device and switch unit 132; an alternator conductor line 154 which leads to the 120 V. control transformer 152 from alternator step-down transformers 155 and 157; a conductor line 159 which leads from the step-down transformers 157 and 158 to a positive or plus switch relay 160; and a conductor line 161 which leads from the positive or plus switch relay 160 to the stepping motor 77.

Figure 4:
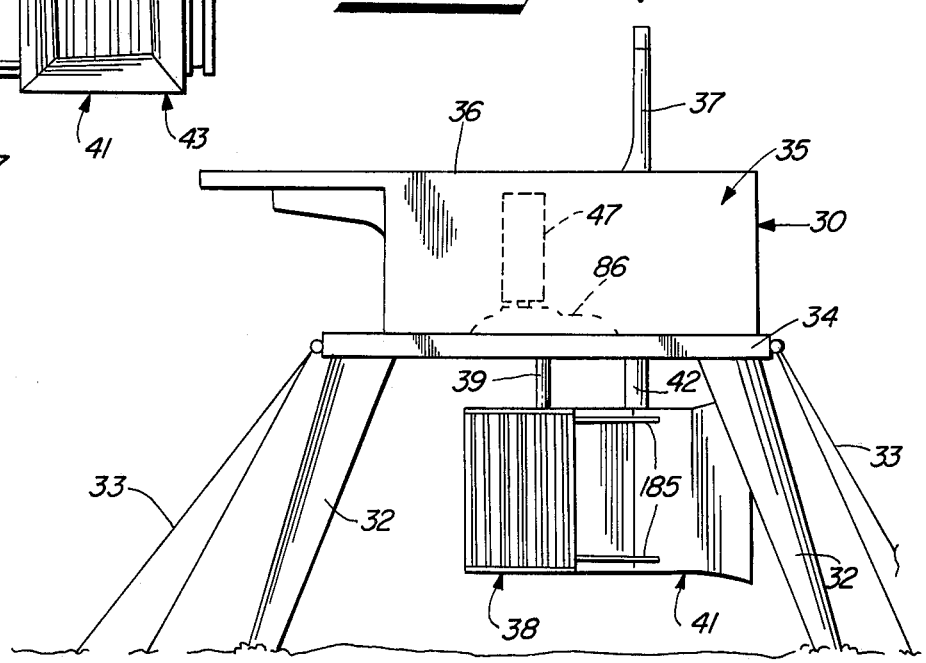
FIG. 4 is a side elevational view of the apparatus on line 4—4 in FIG. 1.

The cable 126 leads from the cable cap 110 (FIGS. 15 and 27) to a 60 V. control transformer 162, and a capacitor 163 is located at the collector plate 184, in order to maintain a constant voltage of 60 V. therein to the switch unit 132. An alternator conductor line 164 leads to the 60 V. control transformer 162 from the step-down transformer 167 to transformers 165 and 162. A conductor line 169 leads from step-down transformers 167 and 168, and conducts operating voltage to negative switch relay 170; and a conductor line 171 leads from the negative switch relay 170 to the stepping motor 77. Alternator output line taps 172 and 173 are arranged within the housing 30 from alternators 47 (FIGS. 1 and 4).

A conductor line 174 leads from the cable cap 111, by way of the collector plate or junction containment 184, to an integrated circuit 175 in which a breaker switch 176 is arranged; and a manual by-pass conductor line 177 leads to the 120 V. control transformer 152 from manual control switch 178.

The cables 126 and 130 are multistrand conductors carrying voltage to and from the cable caps 111 and 110 for distribution in intra direction at the plate or junction containment 184.

The integrated circuits 175 and 180 are biased solid state components intra-connected and function as selective switches. Typical and suitable forms of such integrated circuits are one made by Motorola and known as Motorola IC Catalog Number CM68331 for the integrated circuit 175 and Motorola IC Catalog Number CM15590 for the integrated circuit 180.

Similarly, a conductor line 179 leads from the cable cap 110, by way of the collector plate or junction box 184, to an integrated circuit 180 in which a breaker switch 181 leads to the 60 V. control transformer 162 from negative manual control switch 183.

OPERATION OF THE WATER CURRENT FLOW DIRECTION AND VELOCITY CIRCUIT (FIG. 27)

In a typical and preferred embodiment of the invention, as illustrated in the drawings, the cable cap unit 110 is water-sealed and may be pressure adjusted to maintain the switch unit 132 controlled thereby (FIG. 24), in a closed condition under conditions of a water current flowing into the mouth 106 of the water conducting sensor tube 97 of 2.5 knots fluid velocity, and to open the switch 132 at 2.6 knots fluid velocity as applied by water pressure against the blade 143 of the water-pressure actuated switch-operating member 142-143-144-145-147; the output signal from the switch unit 132 being 60 V. (AC) and 15 amps.

In a typical and preferred embodiment of the invention, the sensor cable cap unit 111 is water-sealed and may be pressure-adjusted to maintain its corresponding switch unit 132 controlled thereby open under a water current flowing into the mouth 106 of the sensor tube 97 in the nozzle 41, and applied against the blade 143 of the switch-operating member 142-143-144-145-147, of 2.5 knots fluid velocity, and to close the switch unit 132 at a fluid velocity of 2.6 knots; the output signal being 120 V. (AC) and 15 amps.

The output current flow from the sealed sensor cable cap units 110 and 111 is as follows:

Assuming that the water current flow into the mouth 44 of the nozzle 47 and into the mouth 106 of the sensor tube 97 is 2.0 knots fluid velocity, the nozzle 41 will remain stationary in the last position which it had previously attained in use. However, if the water current flow into the mouth 44 of the nozzle 41 and into the mouth 106 of the sensor tube 97 increases to 2.6 knots fluid velocity, the sealed cable cap unit 110 will act, through the blade member 143, and its switch-operating arm 144-146-147 to pivot the latter, on its pivotal movement shaft 146 (counterclockwise, FIG. 24) into a position, as shown in FIG. 24, to cause the curved cam arm portion 147 thereof to pivot or cam away from the supporting bracket member 134 and thus allow the accordion-shaped switch-operating member 133 to open the switch unit 132, whereas the sealed cable cap unit 111 will then act, through its switch operating blade 143 and arm member 144-145-147, to move the cam arm 147 thereof against the supporting member 134 and thus cause the accordion-shaped switch operating member 133 to move the movable switch contact members 137 into position to engage the stationary switch contact switch members 138 and thus close the switch 132.

The closing of the switch 132 in the sealed cable cap unit 111 activates or energizes the cable 130 which acts, through the line 130-153-152-154-155-156-157-158 and 159, to activate the positive switch relay 160 to energize the stepping motor 77 which, in turn, will act, through its shaft 79, the clutch coupling 80, the worm screw drive shaft 81 and the all angle ball-shaped internally threaded nut member 60, to pivot the radius arm 55 and the nozzle supporting shaft 42 attached thereto, and the nozzle 41 thereon, until the stepping motor 77 reaches the full limit of its allowable movement, and its amperage accelerates. The breaker switch 176 will then act to open the circuit through the cable 130 and the positive switch relay 160.

At this time, in the example given, the nozzle 41 will be positioned in a direction to utilize a current flow of 2.6 knots fluid velocity and the nozzle 41 will remain in this position until the water current flow velocity of the current entering the mouth 44 of the nozzle 41 and the mouth 106 of the sensor tube 97, falls below 2.5 knots fluid velocity.

When, in the example given, the current flow velocity of the water current entering the mouth 44 of the nozzle 41 and the mouth 106 of the sensor tube 97, falls below a fluid velocity of 2.5 knots, the sealed cable cap unit 110 will act, through the blade 143 and its switch operating arm 144-145-147, and the line 126-163 162-164-165-166-167-168 and 169, to close the corresponding switch units 132 and thus activate the negative switch relay 170 to energize the stepping motor 77 which will then act, through the clutch 80, to rotate the worm screw drive shaft 81 in a direction opposite to the direction of rotation hereinbefore described. This reverse rotation of the worm screw drive shaft 81 will then act, through the all-angle ball-shaped internally threaded nut member 60, and the radius arm 55, to pivot the nozzle supporting shaft 42 and the nozzle 41 mounted thereon, in a direction to dispose the nozzle 41 in a position to utilize to the greatest advantage the water current flowing into the mouth 44 of the nozzle 41 and into the mouth 106 of the sensor tube 97 at a fluid velocity of 2.5 knots or therebelow.

The step-down transformers 155-157-158-165-167 and 168 effect a stepdown of the alternator EMF output into acceptable control and motor voltages.

The capacitors 153 and 163 are included in the sensor control circuit (FIG. 27) to maintain a constant voltage (AC) during high amperage unloading.

If and when it should become necessary to repair the nozzle 41 when it is submerged, for repair by a diver, or for other reasons, such manual control of the nozzle 41 may be provided by the by-pass circuits 177 and 182 and the manually operable and normally closed manual control switches 178 and 183 arranged therein, to enable the nozzle 41 to be moved manually. This may be accomplished by manually opening one or the other of these normally closed manually operable control switches 178 and 183 for the cable sensor control circuits 154-155-156-157-158 and 159 and 164-165-166-167-168 and 169 which may be by-passed and so effect voltage applied directly by the control transformers 152 or 162 to one of the switch relays 160 or 170, respectively. However, if manual control is initiated while nozzle sensor control signals are forthcoming, the breaker switches 176 and 181 will open the lines 178-175-174 or 183-180-179, and thus prevent manual interference with the incoming sensor control signals.

The collector plate or junction box 184 serves the purpose of securing and connecting electrical cables and wires at and into a common junction point or box.

OPERATION OF THE ALTERNATORS OR ELECTRICAL GENERATORS

As the water current flows into and through the nozzle 41 and into the hydraulic turbine 38 the hydraulic turbine 38 is rotated on its supporting shaft 39 and this rotation acts, through the gear train 87-91-89-90-92-92-93-93 and 94 (FIG. 14) to rotate the alternator or electrical generators 47 in the housing 35 and thus generate electrical power which is transmitted by the transmission cables 48 to the point of distribution.

SPECIFICATIONS FOR THE CONSTRUCTION AND INSTALLATION OF CERTAIN COMPONENTS OF A TYPICAL AND PREFERRED EMBODIMENT OF THE INVENTION AS ILLUSTRATED IN THE DRAWINGS AND AS DESCRIBED HEREINBEFORE

Specifications for the construction and installation of certain components of a typical and preferred embodiment of the present invention, as shown in the drawings, and as described hereinbefore, are as follows:

THE CONSTRUCTION OF THE WATER INLET OR INTAKE NOZZLE 41 (FIGS. 1, 2, 3, 4, 5, 6, 7, 8, 9, 10, 15 AND 16

A typical and preferred construction of the water inlet or intake nozzle 41, as illustrated in FIGS. 1, 2, 3, 4, 5, 6, 7, 8, 9, 10, 15 and 16 of the drawings, is preferably made of hot-rolled weldment fabrication of white iron plates one inch (1") in thickness, since this material is highly resistant to the corrosive action of salt water, and suitable dimensions therefor are as follows:

(1) Water inlet height—60 feet;
(2) Water inlet width—30 feet;
(3) Discharge or water outlet height—50 feet;
(4) Discharge or water outlet width—18 feet;
(5) Elliptical tunnel length from water inlet to discharge or water outlet—50 feet;
(6) Angular deflection from the vertical at discharge or water outlet—two degrees (2°)
(7) Spoiler fin width—8 feet; and
(8) Supporting shaft 28 feet in length and 8 feet in diameter.

The discharge orifice of the water inlet or intake nozzle 41 is not exactly vertical in relation to the blades of the hydraulic turbine 38 but is preferably deflected at an angle of two degrees (2°) toward the outboard side of the nozzle 41 at the base thereof since this arrangement enhances the longevity of the radial support bearings for the hydraulic turbine 38.

The fins 185 which are located at the inboard side of the nozzle 41 (FIGS. 3 and 4) establish a vacuum point for the discharge or current from the hydraulic turbine 38 and the fins 185 are therefore arranged horizontally. The nozzle shield 187 (FIG. 2) also effects a similar function at all times except when the nozzle 41 directs a hydraulic force toward the blades of the hydraulic turbine 38 at such an angle as to be equal to a geometrical chord of the turbine diameter in excess of thirty degrees (30°). However, the fins 185 and the nozzle shield 187, under normal current flow conditions, will function nearly in unison.

The hydraulic turbine 38 is preferably constructed of materials which are strong but light in weight such, for example, as steel-reinforced polyvinyl chloride plastic material, or other suitable material, other than aluminum which deteriorates and corrodes in sea water due to ionization, and for other reasons.

THE CONSTRUCTION OF THE DRIVING MEANS FOR OPERATING THE ALTERNATORS OR ELECTRIC GENERATORS 47 UNDER CONTROL OF THE HYDRAULIC TURBINE 38 (FIG. 14)

The driving means for operating the alternators or electrical generators 47, as illustrated in FIG. 14 of the drawings, and which has the form of the gear train 85, includes the main gear 89 which may be 25 feet in diameter and 6 inches in thickness and is preferably made of cast aluminum of high copper content. The planetary idler gears 92 are preferably made of cast aluminum of high copper content and in the typical embodiment of the invention disclosed may be 96" in diameter and 6" thick, and their supporting shafts 186 may be 4" in diameter.

Typical dimensions for the construction of certain other components of a typical and preferred embodiment of the present invention, as shown in the drawings and as hereinbefore described, are as follows:

SUPPORTING PLATFORM 31 AND RELATED PARTS

Length: 138'
Width: 100"
Height at under surface from mean high water: 20'
Height at under surface from bottom ground: 114'
Distance from under surface to hydraulic turbine upper surface: 30'
Height of power house from the upper surface of the platform 34: 50'
Height of 360° blue flashing light 37 from mean high water level: 100'
Helipad length: 72'
Width: 66'

HYDRAULIC TURBINE 38

Diameter: 64'
Depth: 50'
Supporting Shaft Diameter: 5'
Individual blade width: 5'
Individual blade angle, as measured from center: 60°

THE SUPPORTING LEG MEMBERS 32

Width at under surface of platform: 26'
Thickness at under surface of platform: 6'
Taper angle to ground: 65°
Deflection angle of upstream legs: 67°—vertical: 65°
Deflection of angle of downstream legs: 50°—vertical: 65°

TYPICAL SUITABLE OCEAN AREA LOCATIONS FOR INSTALLATION OF THE INVENTION

Ocean current flow velocity is increased when a geographical restriction occurs within its path, causing a "damming" effect. The streams in the Florida straits provide an optimum area for installation of the present invention, since the Bahama Bank and the Florida Keys sub-structures provide the desired flow-damming effect by narrowing the path of the Gulf Stream as it flows north. Moreover, the Gulf Stream has its highest velocity in the Florida Straits relative to the Atlantic Coastal perimeter.

Thus, typical suitable locations for the installation of the present invention, are the following:

(1) Whistle Buoy, R2 FLW
Chart No. 1350
Azimuth, Dist. 138 degrees, 125 yds.
MLW depth 76 feet
Energy constant 2.7 knots
Miles offshore 6.5
(2) Carysfort Reef, GP FL(3) 20 sec.
Chart No. 1350
Azimuth, dist. 148 degrees, 125 yds.
MLW depth 72 feet
Energy constant 3 knots
Miles offshore 6.7
(3) Dixie Shoals, RN4 DS
Chart No. 1350
Azimuth, dist. 120 degrees, 200 yds.
MLW depth 72 feet
Energy constant 3.3 knots
Miles offshore 6
(4) Molasses Reef, Fl 10 sec.
Chart No. 1530
Azimuth, dist. 140 degrees, 500 yds.
MLW depth 76 feet
Energy constant 3.3 knots
Miles offshore 7
(5) Sombrero Reef, GRP FL (5) 15 sec.
Chart No. 1350
Azimuth, dist. 158 degrees, 600 yds.
MLW depth 71 feet Energy constant 2.5 knots
Miles offshore 8
(6) Looe Key, FL (G) 4 sec.
Chart No 1350
Azimuth, dist. 170 degrees, 300 yds.
MLW depth 76 feet
Energy constant 2.1 knots
Miles offshore 8.2
(7) At other locations at any point between the locations set forth above where the water depth is from 70 to 80 feet at MLW.

THE ALTERNATORS OR ELECTRICAL GENERATORS 47 (FIGS. 1 AND 4)

The construction of a typical and preferred embodiment of the alternators or other electrical generators 47, driven by the hydraulic turbine 38 and the gear train 85, etc. (FIG. 14) is as follows:

The alternators or electrical generators 47 may be of any suitable type, and in the preferred embodiment of the invention shown in the drawings and as described above, are preferably of a construction which will deliver approximately 5064 H.P. per second, although they may, of course, be a D.C. generator with the sensor control and operating circuit 152 (FIG. 27) suitably modified and adjusted thereto.

It will thus be seen from the foregoing description, considered in conjunction with the accompanying drawings, that the present invention provides a new and improved hydro-electric apparatus for the generation of electrical power by use of ocean or other water currents, and that the invention thus has the desired advantages and characteristics including those hereinbefore pointed out and others which are inherent in the invention.

I claim:

1. Hydro-electric power generating apparatus for utilization of the hydraulic force of ocean or other water currents for driving a hydraulic turbine and an electrical generator operated thereby for generating electrical power comprising:
   (a) a combination supporting platform and housing having therein
      (1) an electrical generator;
   (b) means for securing the said combination supporting platform and housing above the surface of an ocean or other body of water;
   (c) a hydraulic turbine disposed below the said combination supporting platform and submergible in the said ocean or other body of water;
   (d) mounting means for rotatably mounting the said hydraulic turbine on and suspending it below the said combination supporting platform and housing;
   (e) electrical generator driving means coacting with the said hydraulic turbine mounting means and with the said hydraulic turbine for driving the said electrical generator;
   (f) a water intake or inlet nozzle suspended from the said combination supporting platform and housing and submergible in the said body of ocean or other water and having
      (1) an inlet for the intake of water from the water current in the area of the said body of water in which the said nozzle is submerged; and having
      (2) a water outlet for directing the said water current from the said nozzle into the said hydraulic turbine to rotate the said hydraulic turbine and the said electrical generator and thereby generate electrical power;
   (g) means for suspending the said water intake or inlet nozzle from and below the said combination supporting platform and housing;
   (h) means for transmitting the said electrical power from the said electrical generator to a point of use of the said electrical power;
   (i) water current flow direction and fluid velocity sensing means for sensing the direction of flow and the velocity of the water current in the area of the said body of water in which the said water intake or inlet nozzle is submerged having the maximum velocity and resulting hydraulic force; and
   (j) means cooperating with the said water current flow direction and velocity sensing means for positioning the said water intake or inlet nozzle for the reception of the said water current having the maximum velocity and hydraulic force in the said area in which the said water intake or inlet nozzle is submerged and directing the said water current having the maximum velocity and hydraulic force from the said water intake or inlet nozzle into the said hydraulic turbine.

2. Hydro-electric power generating apparatus as defined in claim 1 in which
   (a) the said means for suspending the said water intake or inlet nozzle below the said combination supporting platform and housing includes
      (1) a vertically extending nozzle-supporting shaft on which the said water intake or inlet nozzle is swively mounted for limited pivotal movement in a generally horizontal plane in an ocean or other body of water; and in which the said vertically extending nozzle-supporting shaft has
         a. an upper end portion extending through the said supporting platform and into the said housing; and in which the said hydro-electric power generating apparatus includes
         b. means arranged in the said housing and cooperating with the said water current direction and velocity sensing means for swively mounting the said nozzle-supporting shaft and the said nozzle mounted thereon for pivotal movement in a generally horizontal plane in the said ocean or other body of water in response to the sensing by the said water current direction and velocity sensing means of the water current direction and maximum fluid velocity and resulting hydraulic force of the water flowing into the said water intake or inlet nozzle and thence into the said hydraulic turbine in the area of the said ocean or other body of water in which the said water intake or inlet nozzle is submerged.

3. Hydro-electric power generating apparatus defined in claim 2 in which
   (a) the said means for suspending the said water intake or inlet nozzle below the said combination supporting platform and housing includes
      (1) a vertically extending nozzle-supporting shaft on which the said water intake or inlet nozzle is swively mounted for limited pivotal movement in a generally horizontal plane in an ocean or other body of water; and in which the said vertically extending nozzle-supporting shaft has a. an upper end portion extending into the said housing; and in which the said hydro-electric power generating apparatus includes b. means arranged in the said housing and cooperating with the said water current direction and velocity sensing means for swivelly mounting the said nozzle-supporting shaft and the said nozzle mounted thereon for pivotal movement in a generally horizontal plane in the said ocean or other body of water in response to the sensing by the said water current direction and velocity sensing means of the water current direction and maximum fluid velocity and resulting hydraulic force of the water flowing into the said water intake or inlet nozzle and thence into the said hydraulic turbine in the area of the said ocean or other body of water in which the said water intake or inlet nozzle is submerged; and (b) a generally horizontally extending radius arm arranged in the said housing and having
  (1) an end portion thereof attached to the said upper end portion of the said nozzle-supporting shaft; and
(c) radius arm operating means under the control of the water current direction and velocity sensing means for swivelly controlling the said radius arm and the said nozzle-supporting shaft and the said nozzle mounted thereon for limited pivotal movement in a generally horizontal plane.

4. Hydro-electric power generating apparatus as defined in claim 3 in which
  (a) the said operating means for the said radius arm includes
    (1) stepping motor means mounted in the said housing; and
    (2) drive shaft means operatively connected to and coacting with the said end portion of the said radius arm for pivotally moving the said radius arm and the said nozzle-supporting shaft and the said water intake or inlet nozzle mounted thereon in a generally horizontal plane.

5. Hydro-electric power generating apparatus as defined in claim 4 which includes
  (a) means coacting with the said water current direction and velocity sensing means for energizing and controlling movement of the said stepping motor means and the said drive shaft means and the said radius arm and the said water intake or inlet nozzle.

6. Hydro-electric power generating apparatus as defined in claim 5 in which
  (a) the said water current direction and fluid velocity sensing means includes
    (1) a tubular water-conducting member having
    (2) a portion mounted in the said water intake or inlet nozzle, and having
      a. a mouth or inlet facing outward from the said mouth or inlet of the said water intake or inlet nozzle for the reception of water flowing into the said water intake or inlet nozzle; and in which
  (b) the said tubular water-conducting member of the said water current direction and velocity sensing means includes
    (1) an inner end portion extending into the said housing and having
      a. sealed or closed end portions; and in which the said water current direction and velocity sensing means includes
    (2) water pressure-responsive means mounted in the said inner end portion of the said tubular water-conducting member; and in which the said water current direction and velocity sensing means includes
    (3) electrical switch means responsive to the movement of the said water-pressure responsive means; and in which the said hydro-electric generating apparatus includes
    (4) electrical circuit means responsive to the action of the said electrical switch means for energizing the said stepping motor means.

7. A hydro-electric power generating apparatus as defined in claim 1 in which
  (a) the said means for suspending the said water intake or inlet nozzle includes
    (1) pivotal mounting means mounted in the said housing for pivotally mounting the said water intake or inlet nozzle for limited pivotal movement in a generally horizontal plane when the said nozzle is submerged in the said body of water; and in which the said hydro-electric power generating apparatus includes
  (b) water current direction fluid velocity sensing means coacting with the said pivotal mounting means and responsive to the velocity of the water current flowing into and through the said water intake or inlet nozzle for pivotally moving the said water intake or inlet nozzle in increments and in a generally horizontal plane in accordance with variations in the velocity of the water current flowing into and through the said water intake or inlet nozzle and into the said hydraulic turbine.

8. A hydro-electric power generating apparatus as defined in claim 1 in which
  (a) the said water current direction and fluid velocity sensing means includes
    (1) tubular water-conducting means for conducting water through the said water intake or inlet end of the said water intake or inlet nozzle and against the said turbine blades;
    (2) fluid pressure responsive means in the path of water flowing into and through the said tubular water-conducting means and responsive to the pressure of the water flowing therethrough;
    (3) an electrical stepping motor mounted in the said housing and having a motor shaft;
    (4) driving means interconnecting the said stepping motor shaft and the said pivotal mounting means for incremental movement of the said water intake or inlet nozzle;
    (5) an electrical control and operating circuit for energizing the said electrical stepping motor and its motor shaft in increments; and
    (6) switch means under control of the said fluid pressure responsive means for energizing the said electrical control and operating circuit and the said stepping motor and coacting with the said stepping motor shaft and the said driving means to pivot the said water intake or inlet nozzle in increments in a generally horizontal plane in accordance with the velocity of the water flowing into the said water intake or inlet nozzle and the said tubular water conducting means.

9. A hydro-electric power generating apparatus as defined in claim 8 in which the said driving means includes
(a) a worm screw drive shaft operatively connected to the said stepping motor shaft;
(b) a radius arm having
  (1) a radially outer end portion connected to the said pivotal mounting means; and
  (2) a radially inner end portion; and in which the said driving means includes
(c) ball and socket means operatively interconnecting the said worm screw drive shaft and the said radially inner end portion of the said radius arm and responsive to the rotary movement of the said worm screw drive shaft.

10. A hydro-electric power generating apparatus as defined in claim 9 in which the said radially inner end portion of the said radius arm has formed therein
(a) a cavity providing a generally cylindrical-shaped socket extending generally horizontally therethrough; and in which the said radially inner end portion of the said radius arm has formed therein
(b) a transversely extending opening; and in which
(c) the said ball and socket means includes a ball-shaped member mounted in the said socket; and in which the said ball-shaped member has formed therein
(d) a diametrically extending screw-threaded passage disposed in alignment with the said transversely extending opening in the said radially inner end portion of the said radius arm; and in which the
(e) said worm screw drive shaft extends through the said transversely extending passage in the said radially inner end portion of the said radius arm and extends through the said diametrically extending screw-threaded passage in the said radially inner end portion of the said radius arm so that rotary movement of the said worm screw drive shaft acts through the said ball-shaped member to impart limited pivotal movement to the said radius arm and to the said water intake or inlet nozzle in a generally horizontal plane.

11. A hydro-electric power generating apparatus as defined in claim 10 in which
(a) a clutch coupling is mounted between and interconnects the said motor shaft of the said stepping motor and the said worm screw drive shaft.

12. A hydro-electric power generating apparatus as defined in claim 11 in which
(a) the said electrical control and operating circuit includes a
  (1) means responsive to the fluid pressure on the said fluid pressure responsive means for energizing the said stepping motor and its motor shaft and the said worm screw drive shaft selectively in increments in opposite directions and thereby impart pivotal movement to the said radius arm and the said water intake or inlet nozzle in opposite directions in a generally horizontal plane.

13. A hydro-electric power generating apparatus as defined in claim 8 in which
(a) the said tubular water-conducting means includes
  (1) a tubular water-conducting member having therein
  (2) a pair of cable cap members mounted on and extending transversely of the said tubular water-conducting member and having communication therewith; and in which the said electrical control and operating circuit includes
(b) switch means mounted in each of the said cable cap members for energizing the said electrical control and operating circuit; and in which the said fluid pressure responsive means includes
(c) a blade member pivotally mounted in each of said cable cap members and disposed in the path of water flowing through the said tubular water conducting means, and including
(d) a cam arm portion adapted to engage the said switch means and to move the said switch means into position to energize the said electrical control and operating circuit.

* * * * *